No. 729,838. Patented June 2, 1903.

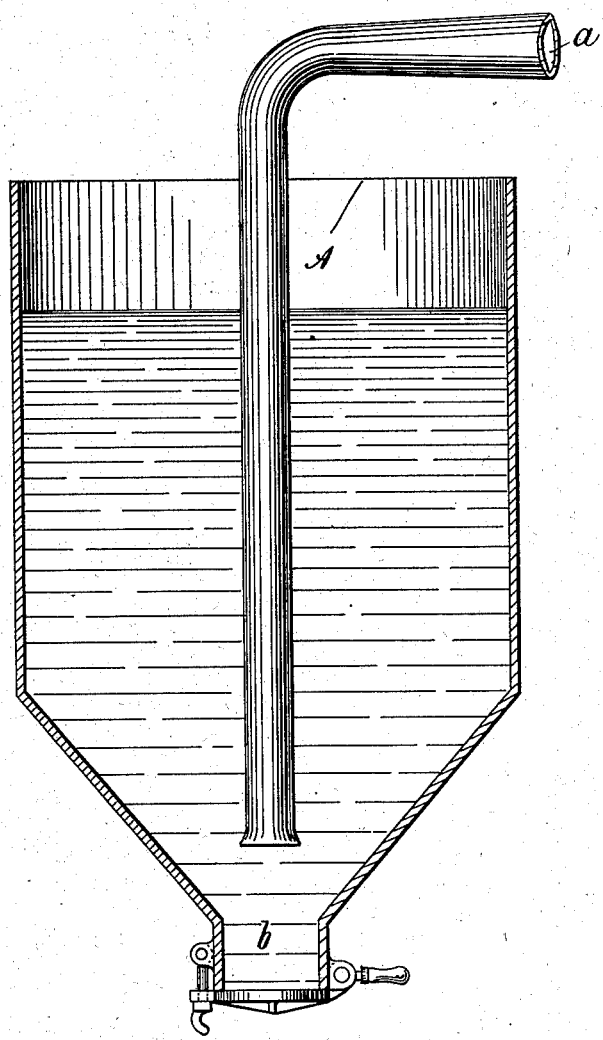

UNITED STATES PATENT OFFICE.

CARL W. BILFINGER, OF FAYETTEVILLE, NORTH CAROLINA, ASSIGNOR OF ONE-HALF TO WILLIAM M. MORGAN, OF FAYETTEVILLE, NORTH CAROLINA.

TREATING CREOSOTE-OIL.

SPECIFICATION forming part of Letters Patent No. 729,838, dated June 2, 1903.

Application filed April 9, 1902. Serial No. 102,062. (No specimens.)

*To all whom it may concern:*

Be it known that I, CARL W. BILFINGER, a citizen of the United States, and a resident of Fayetteville, North Carolina, have invented certain new and useful Improvements in Treating Creosote-Oil, of which the following is a full, clear, and exact specification.

My invention relates to refining and modifying the products of wood distillation; and it consists in the hereinafter specified and claimed process of treating creosote-oil so the same is rendered thereby available for use in combination with cotton-seed oil for grinding and preparing of colors in the same manner as pure linseed-oil was used heretofore.

The substance known in the art and trade as "creosote-oil" or "tar-oil" is recovered by distilling wood and contains besides the oil proper a quantity of creosote, phenol, and pyroligneous acid. Heretofore the substance was treated by a solution of caustic soda of about 18° to 35° Baumé in an air-blowing apparatus for the purpose of eliminating therefrom the creosote and phenol, which substances are absorbed by the solution of soda and then used in manufacture of carbolic acid.

I have discovered that if so-called "creosote-oil" or "tar-oil" is modified by removing therefrom the pyroligneous acid and all water it may contain remaining after the purifying process and a suitable quantity of oxid of lead is added thereto the oil thus modified obtains the quality that when mixed with approximately equal quantity of cotton-seed or other vegetable oil and the mixture thoroughly agitated, so that one substance is thoroughly assimilated by the other, the resulting product will possess the same qualities and utility as linseed-oil for grinding and preparing of colors.

The process is carried on in an apparatus illustrated in the accompanying drawing, showing a sectional view thereof.

The creosote or tar oil is filled into the tank A and approximately one pound of pulverized caustic soda per each fifty gallons of the oil of tar is added thereto. This pulverized caustic soda is successively added to the oil, while a strong blast of air entering through the blow-pipe *a* causes the oil to be agitated in a similar motion as when boiling. After the requisite quantity of the caustic soda is added to the oil the blowing of the air is continued for about twenty minutes longer, whereupon the liquid is allowed to settle. The oil will rise to the top, whereas in the funnel-shaped bottom of the apparatus the sediment will accumulate. This sediment is let out through the outlet-pipe *b* in the bottom of the apparatus. Next an approximately equal quantity of water is added to the oil in the tank and the air-blast turned on again and maintained for about twenty minutes to one-half an hour longer, whereupon the liquid is again allowed to settle. The oil will again flow to the top of the tank, whereas the water and whatever sediment there may yet be in the oil will accumulate at the bottom. This sediment and water are then again let off through the outlet-pipe *b*, and after this is withdrawn the air-blast is again turned on and maintained for approximately two hours. This last air-blowing is for the purpose of driving out from the oil all particles of water that may yet be contained therein. The air-blast causes this water to evaporate. Next a quantity of oxid of lead, approximately five pounds to every fifty gallons of oil, is added to the oil. This must be done successively in small quantities, because the chemical process—the absorbing of the oxid of lead by the oil—causes a violent commotion and foaming of the oil. If a larger quantity of oxid of lead be added to the oil in one instalment, this boiling of the oil would cause it to overflow the tank. While the oxid of lead is being added to the oil the operator must test the resulting product to avoid overfilling it. The quantity of oxid of lead to be added depends on the quality of the oil. If a too-large quantity of oxid of lead be added, the resulting product would become thick and viscous.

The quantity of oxid of lead to be added to the oil does, as stated hereinbefore, vary somewhat, and the proportion cannot be stated more accurately than to say that approximately five pounds of oxid of lead are to be added for each fifty gallons of the oil.

The creosote or tar oil absorbs the oxid of lead absolutely within about thirty minutes. This will be seen when the agitation of the mixture and the foaming cease and the resulting product appears clear and free from bubbles. This completes the process, and the product obtained thereby possesses the quality of readily mixing with or assimilating an approximately equal quantity of cotton-seed oil or other vegetable oil. This oil may be added to it immediately upon the completion of the absorbing of the oxid of lead by the creosote or tar oil, and then the mixture is submitted again to the action of air-blast, as explained above, to facilitate a more complete mixing with or absorption by the modified creosote-oil of the cotton-seed oil.

After the air-blast is stopped the mixture is permitted to settle. There is no chemical transformation produced by this combining of the cotton-seed oil with the modified creosote-oil, but a complete and absolute mixture of the two substances and their assimilation by each other.

The mixture is approximately of the same consistency and specific gravity as linseed-oil and, as I have found through my experiments, possesses for the purpose of grinding and preparing of colors the same properties and in the same degree as pure linseed-oil.

I claim as my invention—

1. The process of producing a substitute for linseed-oil which consists: first in adding to creosote or tar oil, dry pulverized alkali, then withdrawing the sediment; second, washing the said oil with water, then removing the water; third, adding to the oil oxid of lead; fourth, mixing the resulting product with cotton-seed oil or other vegetable oil.

2. The herein-described process of treating creosote or tar oil, which consists: first, in adding to the oil successive doses of dry, pulverized alkali, approximately one pound of alkali to each fifty gallons of the oil in all, and agitating the oil while the alkali is being added thereto; second, agitating the oil after the alkali has been added thereto for about twenty minutes, then allowing it to settle and withdrawing the sediment; third, adding to the oil an approximately equal quantity of water, agitating the mixture for from twenty to thirty minutes, then allowing it to settle and withdrawing the water and the sediment; fourth, blowing forcibly dry air into the oil; and fifth, adding to the oil successive doses of oxid of lead, approximately five pounds of the oxid for every fifty gallons of the oil in all.

CARL W. BILFINGER.

Witnesses:
M. A. HELMKE,
B. R. MARTIN.